United States Patent
Phibbs, Jr. et al.

(10) Patent No.: US 8,374,997 B2
(45) Date of Patent: Feb. 12, 2013

(54) APPLICATION CODE GENERATION AND EXECUTION WITH BYPASS, LOGGING, USER RESTARTABILITY AND STATUS FUNCTIONALITY

(75) Inventors: Paul H. Phibbs, Jr., Escondido, CA (US); Thomas K. Ryan, Valley Center, CA (US)

(73) Assignee: Teradota US, Inc., Dayton, OH (US)

( * ) Notice: Subject to any disclaimer, the term of this patent is extended or adjusted under 35 U.S.C. 154(b) by 827 days.

(21) Appl. No.: 11/351,827

(22) Filed: Feb. 10, 2006

(65) Prior Publication Data

US 2006/0265354 A1 Nov. 23, 2006

Related U.S. Application Data

(60) Provisional application No. 60/683,392, filed on May 20, 2005, provisional application No. 60/714,648, filed on Sep. 7, 2005.

(51) Int. Cl.
*G06F 7/00* (2006.01)

(52) U.S. Cl. ............. 707/609; 707/769; 705/28; 705/35

(58) Field of Classification Search ........................ None
See application file for complete search history.

(56) References Cited

U.S. PATENT DOCUMENTS

| | | | | |
|---|---|---|---|---|
| 5,530,802 A | * | 6/1996 | Fuchs et al. | 714/17 |
| 6,016,501 A | * | 1/2000 | Martin et al. | 1/1 |
| 6,138,112 A | * | 10/2000 | Slutz | 707/2 |
| 6,507,834 B1 | * | 1/2003 | Kabra et al. | 707/2 |
| 6,606,640 B2 | * | 8/2003 | Smith | 1/1 |
| 7,231,267 B2 | * | 6/2007 | Bournas et al. | 700/91 |
| 7,318,045 B2 | * | 1/2008 | Baecker et al. | 705/37 |
| 7,349,874 B1 | * | 3/2008 | Hood | 705/35 |
| 7,357,298 B2 | * | 4/2008 | Pokorny et al. | 235/375 |
| 2006/0178960 A1 | * | 8/2006 | Lepman | 705/30 |

* cited by examiner

*Primary Examiner* — Fred I Ehichioya
*Assistant Examiner* — Hasanul Mobin
(74) *Attorney, Agent, or Firm* — Gates & Cooper LLP

(57) ABSTRACT

A Value Analyzer system is a data-driven computer-facilitated financial model that provides accurate and consistent profitability calculations using account, product and event attributes stored in a relational database managed by a relational database management system (RDBMS). Profitability calculations are performed in the computer by applying one or more rules to the account, product and event attributes accessed from the database, wherein the profitability calculations include setup, generation and execution of structured query language (SQL) statements by the RDBMS. The present invention also monitors the profitability calculations by monitoring the setup, generation and execution of the SQL statements by the RDBMS, in order to provide bypass, logging, user restartability, or status (BLURS) functions for the profitability calculations.

22 Claims, 5 Drawing Sheets

APPLICATION CODE GENERATION AND EXECUTION WITH BYPASS, LOGGING, USER RESTARTABILITY AND STATUS FUNCTIONALITY

CROSS REFERENCE TO RELATED APPLICATIONS

This application claims priority under 35 U.S.C. §119(e) to co-pending and commonly-assigned Provisional Application Ser. No. 60/683,392, entitled "APPLICATION CODE GENERATION AND EXECUTION WITH BYPASS, LOGGING, USER RESTARTABILITY AND STATUS FEATURES," filed on May 20, 2005, by Paul H. Phibbs, Jr. and Thomas K. Ryan, which application is incorporated by reference herein.

This application is related to the following co-pending and commonly assigned patent applications:

Utility application Ser. No. 11/251,667, filed on Oct. 17, 2005, by Paul H. Phibbs, Jr. and Thomas K. Ryan, entitled "PROCESSING FORMULAE IN RULES FOR PROFITABILITY CALCULATIONS FOR FINANCIAL PROCESSING IN A RELATIONAL DATABASE MANAGEMENT SYSTEM," which applications claims priority under 35 U.S.C. §119(e) to Provisional Application Ser. No. 60/714,648, filed on Sep. 7, 2005, by Paul H. Phibbs, Jr. and Thomas K. Ryan, entitled "PROCESSING FORMULAE IN RULES FOR PROFITABILITY CALCULATIONS FOR FINANCIAL PROCESSING IN A RELATIONAL DATABASE MANAGEMENT SYSTEM,";

Utility application Ser. No. 10/227,909, filed on Aug. 26, 2002, by Brian J. Wasserman and Thomas K. Ryan, entitled "PLATFORM INDEPENDENT ARCHITECTURE FOR FINANCIAL PROCESSING IN A RELATIONAL DATABASE MANAGEMENT SYSTEM,";

Utility application Ser. No. 10/227,783, filed on Aug. 26, 2002, by George R. Hood, Brian J. Wasserman, Thomas K. Ryan and Sang Y. Yum, entitled "SELECTION PROCESSING FOR FINANCIAL PROCESSING IN A RELATIONAL DATABASE MANAGEMENT SYSTEM,";

Utility application Ser. No. 10/227,726, filed on Aug. 26, 2002, by Richard C. Schwarz, Brian J. Wasserman, Sang Y. Yum and Thomas K. Ryan, entitled "DRIVER AMOUNT/COUNT SELECTION FOR FINANCIAL PROCESSING IN A RELATIONAL DATABASE MANAGEMENT SYSTEM,";

Utility application Ser. No. 10/227,976, filed on Aug. 26, 2002, by Brian J. Wasserman, George R. Hood and Thomas K. Ryan, entitled "DISCRETE PROFITABILITY CALCULATIONS FOR FINANCIAL PROCESSING IN A RELATIONAL DATABASE MANAGEMENT SYSTEM,";

Utility application Ser. No. 10/228,022, filed on Aug. 26, 2002, by Brian J. Wasserman, George R. Hood and Thomas K. Ryan, entitled "RULES-BASED, DATA-DRIVEN PROFITABILITY CALCULATIONS FOR FINANCIAL PROCESSING IN A RELATIONAL DATABASE MANAGEMENT SYSTEM,";

Utility application Ser. No. 10/228,031, filed on Aug. 26, 2002, by Brian J. Wasserman, entitled "OBJECT-ORIENTED REPRESENTATION OF A GENERIC PROFITABILITY RULE FOR FINANCIAL PROCESSING IN A RELATIONAL DATABASE MANAGEMENT SYSTEM,";

Utility application Ser. No. 10/016,779, filed on Dec. 10, 2001, by Brian J. Wasserman, entitled "PARALLEL SELECTION PROCESSING FOR FINANCIAL PROCESSING IN A RELATIONAL DATABASE MANAGEMENT SYSTEM,";

Utility application Ser. No. 10/013,422, filed on Dec. 10, 2001, by Brian J. Wasserman, entitled "ACCOUNT SELECTION FOR FINANCIAL PROCESSING IN A RELATIONAL DATABASE MANAGEMENT SYSTEM,";

Utility application Ser. No. 10/013,434, filed on Dec. 10, 2001, by Brian J. Wasserman, entitled "DRIVER AMOUNT AND COUNT SELECTION PROCESSING FOR FINANCIAL PROCESSING IN A RELATIONAL DATABASE MANAGEMENT SYSTEM,";

Utility application Ser. No. 10/016,452, filed on Dec. 10, 2001, by Brian J. Wasserman, George R. Hood, and Thomas K. Ryan, entitled "DYNAMIC EVENT SELECTION FOR FINANCIAL PROCESSING IN A RELATIONAL DATABASE MANAGEMENT SYSTEM,";

Utility application Ser. No. 09/943,060, filed on Aug. 30, 2001, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM,";

Utility application Ser. No. 09/943,059, filed on Aug. 30, 2001, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM,";

Utility application Ser. No. 09/845,461, filed on Apr. 30, 2001, by George R. Hood, entitled "TAX ADJUSTMENT FOR FINANCIAL PROCESSING IN A RELATIONAL DATABASE MANAGEMENT SYSTEM,";

Utility application Ser. No. 09/845,924, filed on Apr. 30, 2001, by George R. Hood, entitled "AMORTIZATION FOR FINANCIAL PROCESSING IN A RELATIONAL DATABASE MANAGEMENT SYSTEM,";

Utility application Ser. No. 09/845,851, filed on Apr. 30, 2001, by George R. Hood, entitled "SHAREHOLDER VALUE ADD FOR FINANCIAL PROCESSING IN A RELATIONAL DATABASE MANAGEMENT SYSTEM,";

Utility application Ser. No. 09/608,355, filed on Jun. 29, 2000, by George R. Hood and Paul H. Phibbs, Jr., entitled "ADVANCED AND BREAKTHROUGH NET INTEREST REVENUE IMPLEMENTATION FOR FINANCIAL PROCESSING IN A RELATIONAL DATABASE MANAGEMENT SYSTEM,";

Utility application Ser. No. 09/610,646, filed on Jun. 29, 2000, by George R. Hood and Paul H. Phibbs, Jr., entitled "BASIC AND INTERMEDIATE NET INTEREST REVENUE IMPLEMENTATION FOR FINANCIAL PROCESSING IN A RELATIONAL DATABASE MANAGEMENT SYSTEM,";

Utility application Ser. No. 09/608,681, filed on Jun. 29, 2000, by George R. Hood, entitled "OTHER REVENUE IMPLEMENTATION FOR FINANCIAL PROCESSING IN A RELATIONAL DATABASE MANAGEMENT SYSTEM,";

Utility application Ser. No. 09/608,675, filed on Jun. 29, 2000, by George R. Hood, entitled "DIRECT EXPENSE IMPLEMENTATION FOR FINANCIAL PROCESSING IN A RELATIONAL DATABASE MANAGEMENT SYSTEM,";

Utility application Ser. No. 09/608,342, filed on Jun. 29, 2000, by George R. Hood, entitled "INDIRECT EXPENSE IMPLEMENTATION FOR FINANCIAL PROCESSING IN A RELATIONAL DATABASE MANAGEMENT SYSTEM,"; and Utility application Ser. No. 09/608,682, filed on Jun. 29, 2000, by George R. Hood, entitled "RISK PROVISION IMPLEMENTATION FOR FINANCIAL PROCESSING IN A RELATIONAL DATABASE MANAGEMENT SYSTEM,"; all of which applications are incorporated by reference herein.

BACKGROUND OF THE INVENTION

1. Field of the Invention

This invention relates in general to financial processing systems performed by computers, and in particular, to application code generation and execution with bypass, logging, user restartability and status features using a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, in that they are based on complex relational database management systems (RDBMS's).

In such systems, the financial processing includes the generation and execution of SQL statements by the RDBMS. However, such systems, due to their complexity, may be prone to errors and difficult to monitor. For example, previously, users would start a job comprised of one or more SQL statements, and have little control as to when and how the statements completed. When an error occurred, the user would have a substantial effort to find the location and cause of the error. In addition, the user would have to reset and restart the job from the beginning, resulting in a substantial loss of time.

There is a need, then, for an improved approach for performing financial processing using a relational database management system, especially in the area of application code generation and execution. The present invention satisfies that need.

SUMMARY OF THE INVENTION

A Value Analyzer system is a data-driven computer-facilitated financial model that provides accurate and consistent profitability calculations using account, product and event attributes stored in a relational database managed by a relational database management system (RDBMS).

The present invention performs one or more profitability calculations by applying one or more rules to account, product and event attributes accessed from a relational database management system (RDBMS), wherein the profitability calculations include setup, generation and execution of structured query language (SQL) statements by the RDBMS. The present invention also monitors the profitability calculations by monitoring the setup, generation and execution of the SQL statements by the RDBMS, in order to provide bypass, logging, user restartability, or status (BLURS) functions for the profitability calculations.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A Value Analyzer system is a data-driven computer-facilitated financial model that provides accurate and consistent profitability calculations using account, product and event attributes stored in a relational database managed by a relational database management system (RDBMS).

Hardware and Software Environment

Figure 1:
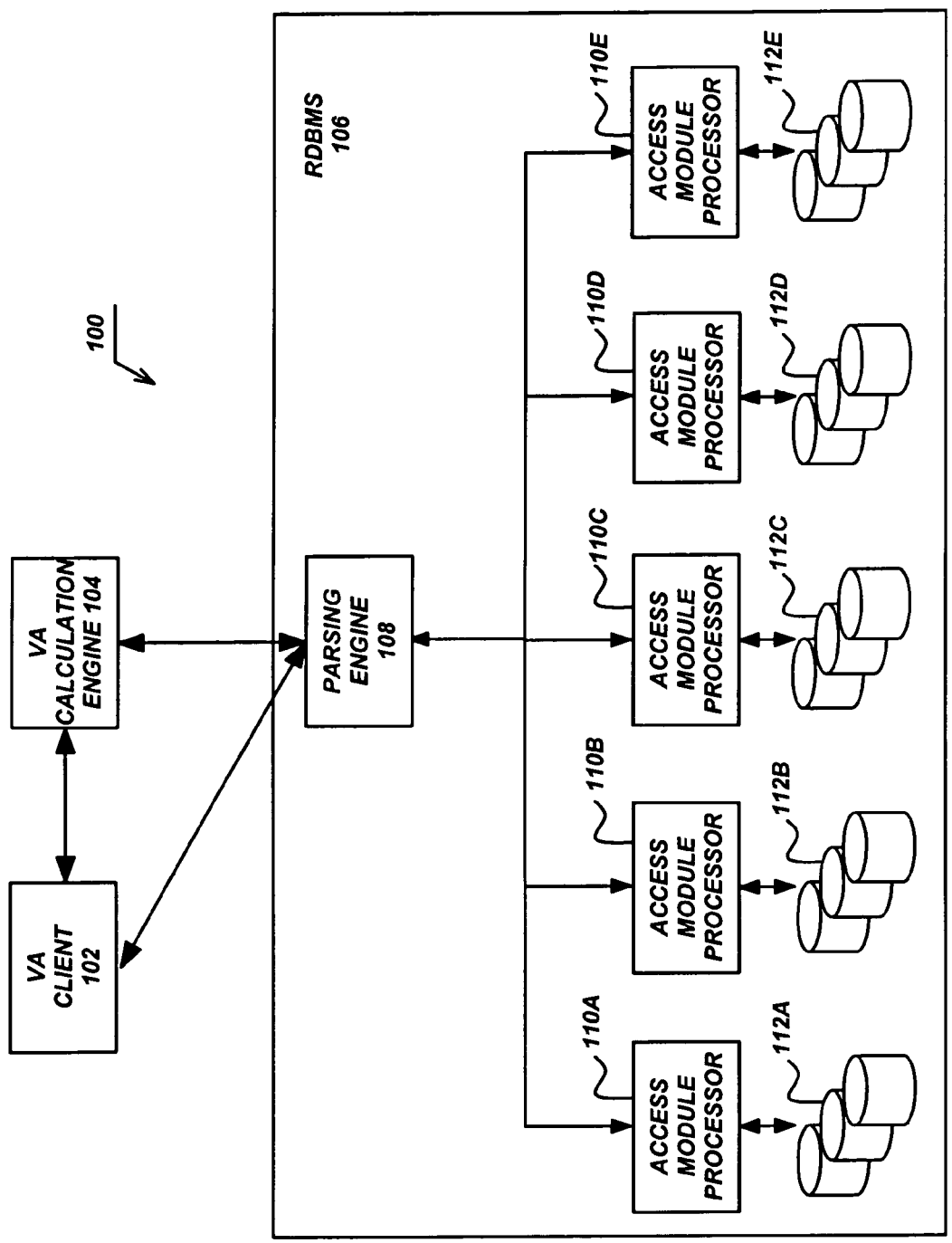
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a financial processing system, known as the Value Analyzer system 100, in a three-tier client-server architecture, wherein the first or client tier provides a Value Analyzer Client 102 that may include, inter alia, a graphical user interface (GUI), the second or middle tier provides a Value Analyzer Calculation Engine 104 for performing functions as described later in this application, and the third or server tier comprises a Relational DataBase Management System (RDBMS) 106 that stores data and metadata in a relational database. The first, second, and third tiers may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

Generally, the Value Analyzer Client 102 includes a graphical user interface (GUI) for operators of the system 100, wherein requests are transmitted to the Value Analyzer Calculation Engine 104 and/or the RDBMS 106, and responses are received therefrom. In response to the requests, the Value Analyzer Calculation Engine 104 performs the functions described below, including formulating queries for the RDBMS 106 and processing data retrieved from the RDBMS 106. Moreover, the results from the functions performed by the Value Analyzer Calculation Engine 104 may be provided directly to the Value Analyzer Client 102 or may be provided to the RDBMS 106 for storing into the relational database. Once stored in the relational database, the results from the functions performed by the Value Analyzer Calculation Engine 104 may be independently retrieved from the RDBMS 106 by the Value Analyzer Client 102.

Note that the Value Analyzer Client 102, the Value Analyzer Calculation Engine 104, and the RDBMS 106 may be implemented in separate machines, or may be implemented as separate or related processes in a single machine. Moreover, in the preferred embodiment, the system 100 may use any number of different parallelism mechanisms to take advantage of the parallelism offered by the multiple tier architecture, the client-server structure of the Value Analyzer Client 102, Value Analyzer Calculation Engine 104, and RDBMS 106, and the multiple Access Module Processors 110 of the RDBMS 106. Further, data within the relational database may be partitioned across multiple data storage devices 112 to provide additional parallelism.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Operation

The Value Analyzer system 100 is a data-driven computer-facilitated financial model that provides accurate and consistent profitability calculations using account, event and Product data stored in the RDBMS 106, wherein: (1) the account attributes comprise data about accounts being measured, (2) the event attributes comprise data about account-related transactions, and (3) product attributes comprise data about products being purchased. The profitability calculations performed by the Value Analyzer system 100 rely on a Five Factor Atomic Profit Metric (FFAPM):

Profit=Net Interest Revenue (NIR)
+Other Revenue (OR)
−Direct Expense (DE)
−Indirect Expense (IE)
−Risk Provision (RP)
=NIR+OR−DE−IE−RP In the above equation, it is assumed that the sign of elements that reduce profit are negative and those that contribute are positive.

Each of the five factors of FFAPM are defined below:
Net Interest Revenue. This component comprises interest revenue, and is the largest component of profitability (e.g., from loans, deposits, cash, etc.).
Other Revenue. This component comprises non-interest revenue (e.g., fees and commissions), including those driven by events (e.g., open account, excessive counter withdrawals, early payout penalties, etc.).
Direct Expense. This component comprises expenses driven by events that are attributable to accounts.
Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).
Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and Product data, and enable consistent multiple dimensional aggregation.

The FFAPM is "atomic" in that profitability is computed using data stored in the RDBMS 106. There are three aspects to this:
components of profitability may be measured below the account level (at events which make up account activity over an accounting period) and accumulated to the account,
components of profitability may be measured directly at the account level (such as interest paid or earned for an accounting period),
components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Value Analyzer Data Flow

Figure 2:
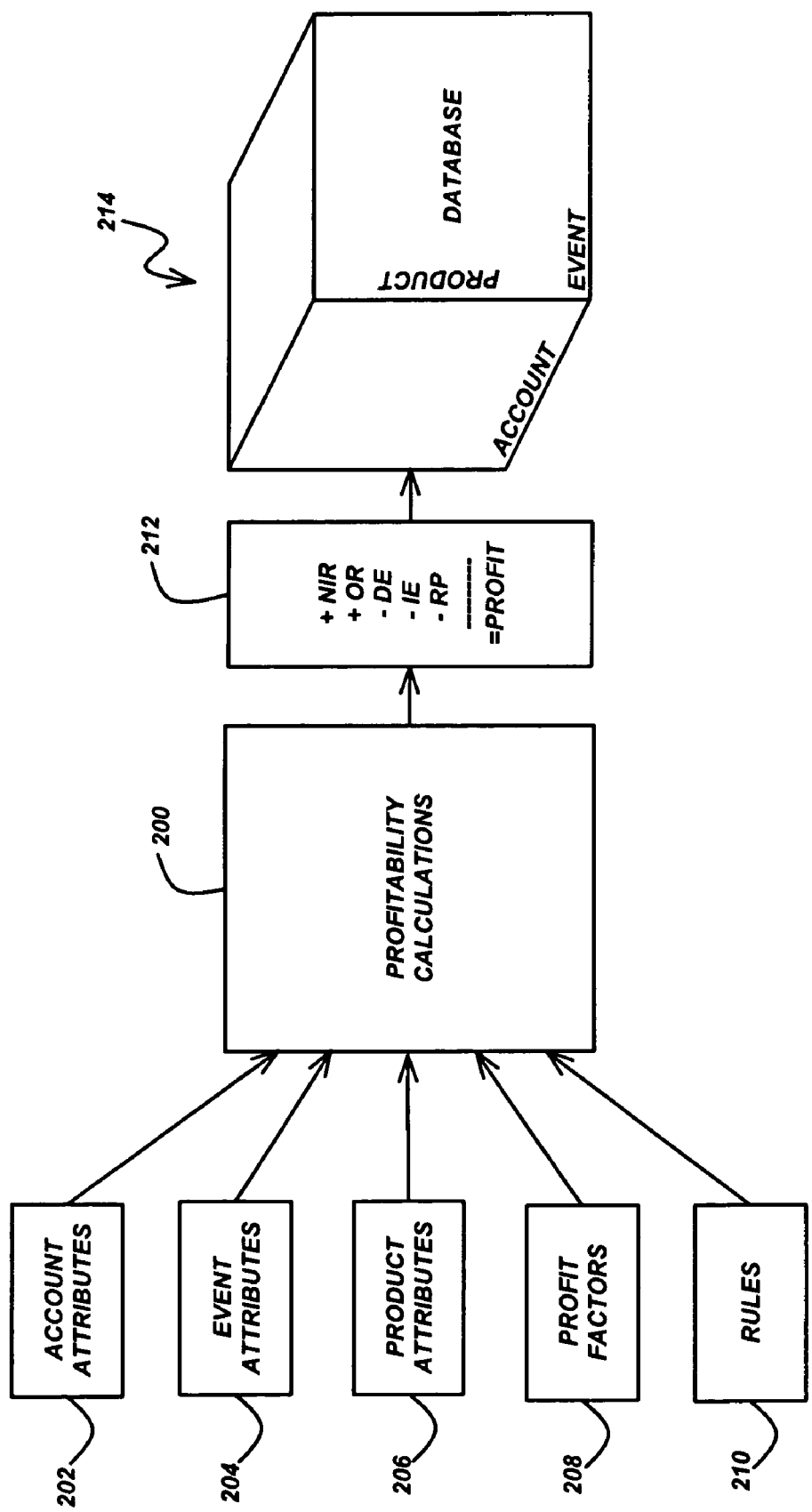
FIG. 2 is a data flow diagram that illustrates the operation of the Value Analyzer according to the preferred embodiment of the present invention.

FIG. 2 is a data flow diagram that illustrates the operation of the Value Analyzer system 100 according to the preferred embodiment of the present invention. Within the Value Analyzer Calculation Engine 104, one or more Profitability Calculations 200 accept a number of inputs including Account Attributes 202, Event Attributes 204, Product Attributes 206, and Profit Factors 208. Thereafter, the Profitability Calculations 200 invoke one or more Rules 210 that generate the FFAPM 212, which in turn are used to create the Database 214. The Database 214 may be represented along account, event, or product dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Product Attributes 206 comprise data about products being purchased. This data includes product identification, unit price amounts, etc.

Profit Factors 208 include parameter values necessary to perform the Profitability Calculations 200. The major classifications of this data include:

Funds transfer rates are pricing methods that require matched maturity opportunity rates for use in valuing each account's marginal use or source of internal funds.

Unit costs are used for Direct Expense calculations, where a total cost is provided as an Product Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)

Allocated amounts are used in both Other Revenue and Indirect Expense calculations, wherein the allocated amounts are apportioned amongst all accounts in a group.

Miscellaneous calculation values may comprise, for example, the number of days in a profit measurement period, an equity allocation weighting, etc. These values are known as "modeling" parameters.

Amortization parameters are used in interest amortization, which requires interest rates and life values used by straight-line amortization and by declining balance of amortization.

Risk measurement parameters are used in Risk Provision calculations, which require various factors, such as: loss rates, reserve percentages, exposure factors, recovery rates, default probabilities and collection costs.

Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting a organization's balance sheet requires a method of valuing the account's use of internal funds. One approach is "matched maturity funds transfer pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Product Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocation rules, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer system 100 is designed to reconcile to the financial statement's profit values, it supports deferral and accrual accounting principles. Amortization methods that account for these timing differences are: interest amortization (used for interest income and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer system 100 calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied depending on the path (or dimension) of aggregation. These rules allow for multiple Profitability Calculations rules to be applied to derive multiple account level Indirect Expense amounts.

Risk Provision. Adjusting current profit for expected future losses is known as "actuarial" profit provisioning. The Value Analyzer system 100 applies actuarial-based methods in its account level Profitability Calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer system 100 adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer system 100 can calculate profits for any number of periods, the adjustment of cash interest payments, and the financial statement's accrual or smoothed representation of interest-related Profit, the Value Analyzer system 100 provides a method for converting cash interest amounts to accrual amounts for financial statements. The Value Analyzer system 100 implements an "effective interest rate" conversion to accomplish this type of calculation.

Shareholder Value Add. Shareholder Value Add (SVA) is used to calculate Earnings, and is a method that Financial Institutions use to adjust Profit for risk. The idea is to subtract the cost of the equity required to support the profit measure from the profit measure. Financial Institutions use this risk adjustment measure to penalize the profit for risk.

Allocated Balances. The Value Analyzer system 100 uses Allocated Balances (AB) functionality as a Cost of Funds for the NIR calculation. Specifically, the Cost of Funds include Allocated Balances that are used to assign balance sheet amounts that are not actual account balances and the Allocated Balances are selected from a group comprising Float, Fixed Assets, Payables and Receivables balances.

Rule Ordering

The Profitability Calculations 200 may include performing a Rule 210 ordering process for at least one of the Rules 210 applied in the Profitability Calculations 200. The Rule 210 ordering process is based on the concept that at least one of the Rules 210 may have dependencies on other Rules 210, which may thus require multiple levels of a Profitability Calculation 200 to be generated. Rules 210 without dependencies are processed first, followed by Rules 210 that have dependencies on Rules 210 processed previously. The Rule 210 ordering process further comprises iteratively processing the Rules 210 until all of the Rules 210 have been processed.

This ensures that, during execution, Rules 210 are run after Rules 210 on which they are dependent for results. The Value Analyzer Calculation Engine 104 controls the Rule 210 ordering process, through execution of the Profitability Calculations 200, by selecting each set of Rules 210 and generating SQL statements in response thereto.

Figure 3:
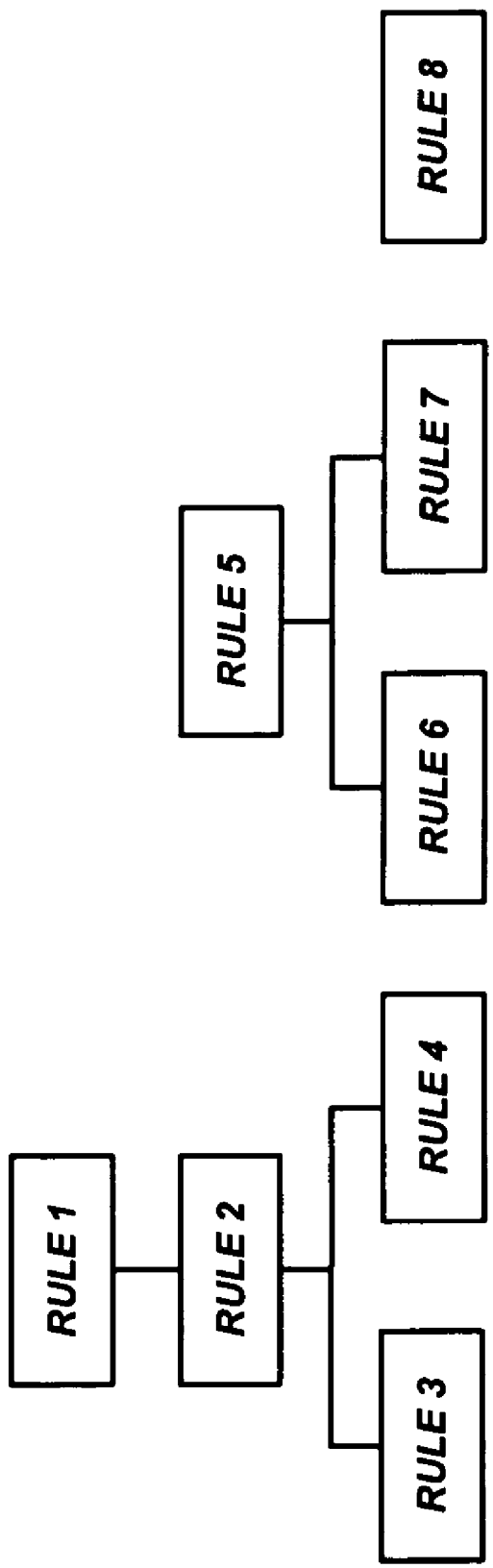
FIG. 3 is a block diagram that illustrates a Rule Ordering example according to the preferred embodiment of the present invention.

In the Rules 210 ordering process example of FIG. 3, the Value Analyzer Calculation Engine 104 initially determines that this is the first run through a Profitability Calculation 200 and selects the set of Rules 210 with no dependencies, (in the figure, rules 1, 5, and 8) for processing. Upon completion of these Rules 210, the Value Analyzer Calculation Engine 104 determines that more Rules 210 need to be processed, and selects Rules 210 that are dependent on the Rules 210 already processed (in the figure, rules 2, 6, and 7), which are then be processed by the Value Analyzer Calculation Engine 104. These steps continue any number of times until no more Rules 210 are left to be processed, and the Value Analyzer Calculation Engine 104 proceeds on to the next Profitability Calculation 200 to be processed. Generally, Rules 210 without dependencies are processed first, followed by Rules 210 that have dependencies on the Rules 210 processed previously. This iterative process continues until all Rules 210 have been processed. Moreover, this methodology can support any number of levels of Rules 210.

Profitability Calculations

The following describes the method used by the Profitability Calculations 200:

1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profitability Calculations 200 generate one or more values for the five factors of the FFAPM 212, and specifically, the NIR, OR, DE, IE, RP, and Profit values. These values are used to generate the Database 214, which comprises one or more tables stored by the RDBMS 106 in the relational database.

BLURS (Bypass, Logging, User Restartability, and Status)

The Value Analyzer system 100 includes an application code generation and execution methodology, known as BLURS (Bypass, Logging, User Restartability, and Status) functions, that allows for n-level Profitability Calculations 200, execution management (bypass, user restartability), execution logging, and real-time status capabilities. Specifically, the BLURS functions manage the setup, generation of SQL statements, and the subsequent execution of SQL statements.

In the Value Analyzer system 100, the Value Analyzer Calculation Engine 104 oversees the execution of Profitability Calculations 200 including the generation and execution of SQL statements by the RDBMS 106. Previously, users would start a job comprised of one or more Profitability Calculations 200, and including one or more SQL statements, and have little control as to when and how it completed. When an error occurred, the user would have a substantial effort to find the location and cause of the error. In addition, the user would have to reset and restart the job from the beginning, resulting in a substantial loss of time.

In the preferred embodiment, the Value Analyzer system 100 performs financial processing by performing Profitability Calculations 200 by applying Rules 210 to account, product and event attributes 202, 206, 204 accessed from the RDBMS 106, wherein the Profitability Calculations 200 include setup, generation and execution of SQL statements by the RDBMS 106. Using the BLURS functions, the Value Analyzer system 100 monitors the Profitability Calculations 200 by monitoring the setup, generation and execution of the SQL statements by the RDBMS 106, in order to provide bypass, logging, user restartability, or status (BLURS) functions for the Profitability Calculations 200.

The BLURS functions provide the following:

A Bypass functionality that recognizes when a fatal error has occurred and abort a job, or bypasses remaining steps of the job.

A Logging functionality that captures information about a job, and archives the job to an archive table in the RDBMS 106 for future reference. The Logging functionality occurs before and after each SQL statement is processed, and after restart and bypass checks.

A User Restartability functionality that automatically recognize that a restart of a previously aborted job is in process and skips previously successful processing of the job, thereby picking up the job where the fatal error occurred. Thus, the Bypass functionality allows a job to terminate once a fatal error has occurred. If the error is reparable, the Restart functionality allows the user to start the job again, skip successfully processed statements and restart at the point of the previous error. The User Restartability functionality uses Logging data to determine if a job is being newly run or restarted from a previous run.

A Status functionality, which is closely related to Logging, that captures a current status of a job, allowing users to query a table in the RDBMS 106 to obtain the current status of the job.

The BLURS functions use stored procedures, tables and coding concepts to provide a job management and execution facility for the Value Analyzer system 100. Processing preferably occurs within the Value Analyzer Calculation Engine 104 and the RDBMS 106, although processing may be performed by other modules as well.

Calc-Engine-SQL Table

In the preferred embodiment, the RDBMS 106 stores a table, known as the Calc_Engine_SQL table, which is the main repository for BLURS information. This table is used by the BLURS functionality to store generated SQL statements, current status of jobs, timings, activity counts or error codes for each SQL statement in real-time. This table is also selected or queried by a user in order to view what SQL statement the RDBMS 106 is currently processing, what SQL statements that have generated errors in the RDBMS 106, the current status of the job, the timings, the activity counts or the error codes for each SQL statement in real-time.

In the preferred embodiment, the Calc_Engine_SQL table is defined as follows:

CREATE SET TABLE CALC_ENGINE_SQL
Calc_Engine_SQL_Seq_Num INTEGER,
Metric_Cd INTEGER,
Calc_Engine_Function_Cd BYTEINT,
Calc_Engine_Intrnl_Process_Num INTEGER,
SQL_Stmt_Function_Type_Cd SMALLINT,
SQL_Stmt_Txt VARCHAR(32000) CHARACTER,
SQL_Stmt_Start_Dttm TIMESTAMP(6),
SQL_Stmt_End_Dttm TIMESTAMP(6),
SQL_Stmt_Elapsed_Tm_DD INTERVAL DAY(2) TO SECOND(6),
SQL_Stmt_Status_Cd BYTEINT,
SQL_Stmt_Status_Msg_Cd SMALLINT,
DBMS_Error_Cd INTEGER,
DBMS_Activity_Cnt INTEGER,
DBMS_Session_Id INTEGER)
UNIQUE PRIMARY INDEX (Calc_Engine_SQL_Seq_Num);

The Calc_Engine_SQL table is used by the BLURS functions to hold generated SQL statements, status, timings, activity counts and error codes for each SQL statement in real-time. The user can select or query from this table in order to view the current status of a job, what SQL statement the RDBMS 106 is currently processing, and what SQL statements that have generated errors.

Following is a brief description of some of the columns in the Calc_Engine_SQL table:

Calc_Engine_SQL_Seq_Num—The unique identifier for the row, in "run" order.

Metric_Cd—A code that identifies the FFAPM metric (e.g., 1=NIR, 2=OR, 3=DE, 4=IE, 5=RP, 6-Profit.) that is the subject of the Profitability Calculation 200.

Calc_Engine_Function_Cd—A code that describes the source of the work done by this statement (1-Selector, 2-Engine).

Calc_Engine_Intrnl_Process_Num—A reference to the procedure or process that generated the statement.

SQL_Stmt_Txt—The actual SQL statement text to be executed.

SQL_Stmt_Start_Dttm—The start date and time of the transaction, which is updated during the execution process prior to the execution of the SQL statement.

SQL_Stmt_End_Dttm—The end date and time of the transaction, which is updated during the execution process after the execution of the SQL statement.

SQL_Stmt_Elapsed_Tm_DD—The total time to execute the transaction, which is calculated during the execution process after completion of the SQL statement.

SQL_Stmt_Status_Cd—A code ranging from 1 to 6 indicating the status of this SQL statement. The code is a foreign key to a table with one word descriptions of the codes: 1-Pending, 2-Working, 3-Success, 4-Warning, 5-Error, and 6-Break.

SQL_Stmt_Status_Msg_Cd—A number identifier that joins to a table with a message.

DBMS_Error_Cd—A code returned by the RDBMS 106 for the transaction, which is updated during the execution process after completion of the SQL statement (typically 0 for success, and a 4-digit code for any error).

DBMS_Activity_Cnt—The number of rows processed by the transaction, which is updated after completion of the SQL statement.

DBMS_Session_Id—A session_id for the session that executed the SQL statement.

BLURS Processing

With the BLURS functions, processing occurs generally in two parts:

An SQL Generation Phase performed by the Value Analyzer Calculation Engine 104, and An SQL Execution Phase performed by the RDBMS 106.

The SQL Generation Phase generates the SQL statements, and the SQL Execution Phase executes the SQL statements in the identified order. The specifics of the BLURS functions in both of these phases are described below:

Bypass

Before each statement is processed in the execution phase, the Calc_Engine_SQL table is checked for a prior statement that has generated a fatal error. If an 'Error' is found (a SQL_Stmt_Status_Cd=5), the current statement is bypassed, which is to say it will not run. The net effect of this processing is that, after a fatal error status has been generated for a statement, all statements following sequentially are bypassed, essentially aborting the job. A user monitoring the status of a job via the Calc_Engine_SQL table, upon witnessing a statement status being updated with an 'Error' status, should see the job quickly come to an end.

Logging

Logging occurs before and after each statement is processed, and after the restart and bypass checks. The "before" logging updates the Calc_Engine_SQL table with information indicating that the SQL is 'Working' (a SQL_Stmt_Status_Cd=2) and sets the start time for execution of the statement. The "after" logging occurs immediately following execution of the statement, and updates the status with either a 'Success,' 'Error,' or 'Warning' code, as well as the stop time, calculated elapsed time, and the activity count. This information may be used for Bypass and User Restartability, as well as debugging and run analysis. When a job is finished, a copy of the job is archived to the archive table.

User Restartability

User Restartability uses the Logging data to determine if a job is being newly run or restarted from an existing run. The SQL Generation phase loads each statement with a 'Pending' status (a SQL_Stmt_Status_Cd=1). Before each statement is processed, the Calc_Engine_SQL table is checked for the status of the statement. If the statement has a 'Success' or 'Warning' status (a SQL_Stmt_Status_Cd=3 or 4), the statement is considered as already having been run and is skipped. If the status is 'Error' (a SQL_Stmt_Status_Cd=5), the statement is considered as a statement that failed in a previous run, and is attempted again (it is assumed that some corrective measure has been taken by the user in order for the statement to be re-tried). A 'Pending' status for a statement indicates that the statement has not been previously attempted, and it is executed.

Status

The Status function is an extension of the Logging capability in that the Value Analyzer Calculation Engine 104 and/or RDBMS 106 updates the Calc_Engine_SQL table as events occur. This allows the user to query the Calc_Engine_SQL table and obtain specific information on the job in real-time while the job is being processed.

Engine Monitor Window on Presentation Layer

Figure 4:
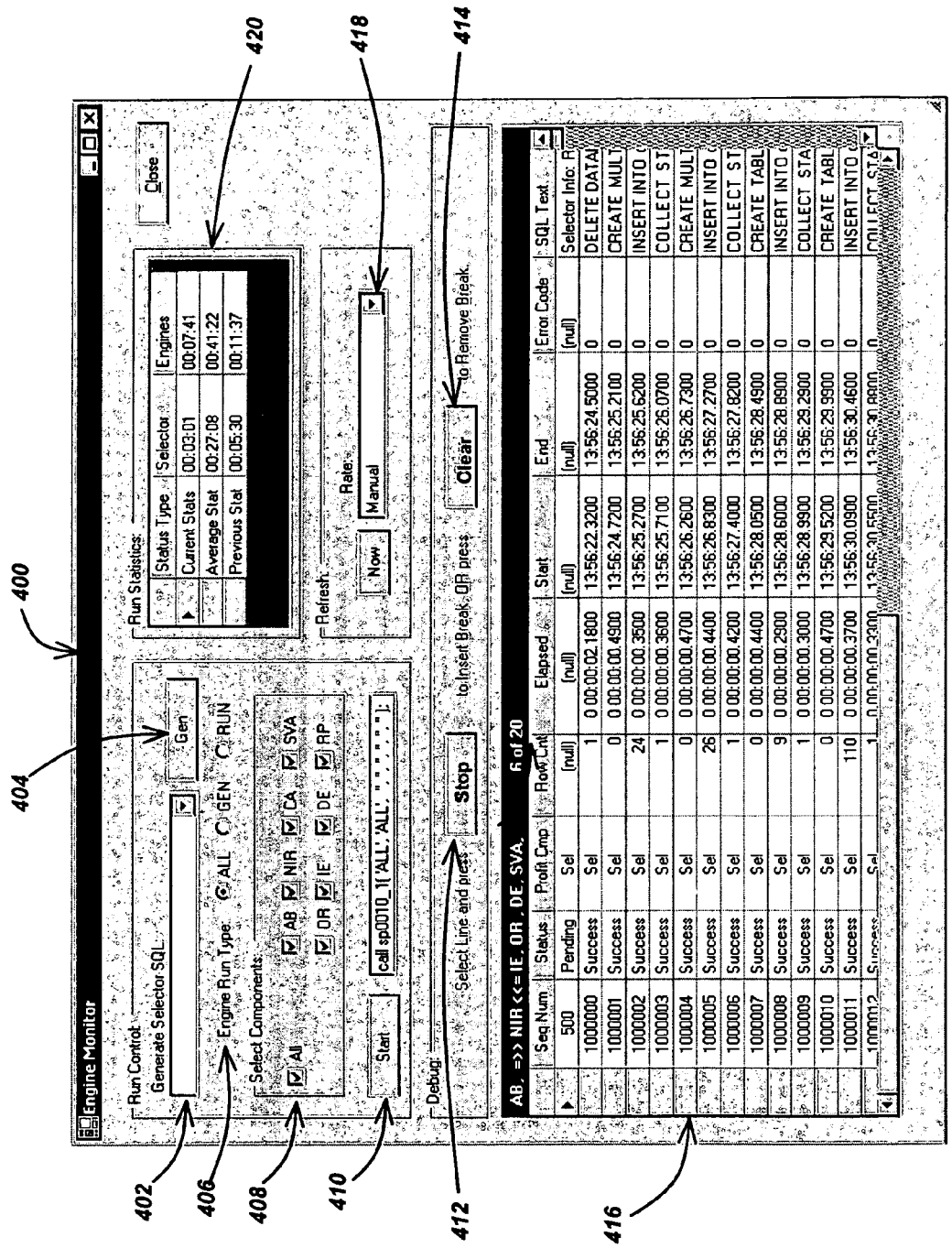
FIG. 4 illustrates an Engine Monitor Window that comprises a graphical user interface (GUI) for the BLURS functions according to the preferred embodiment of the present invention.

FIG. 4 illustrates an Engine Monitor Window 400 that is a graphical user interface (GUI) displayed by the Value Analyzer Client 102 for the BLURS functionality.

The Engine Monitor Window 400 provides a convenient way for the user to Start, Monitor, Break or Stop execution of a job.

Field 402 allows a user to specify the Selector SQL statement and Gen button 404 begins the generation of the Selector SQL statement. Field 406 allows the user to specify the run type, either ALL (generate and execute the SQL statements), GEN (generate the SQL statements), or RUN (execute the SQL statements).

Field 408 allows a user to select the FFAPM metrics of the Profitability Calculation 200 to generate (i.e., AB—Allocated Balances, NIR—Net Interest Revenue, CA—???, SVA—Shareholder Value Add, OR—Other Revenue, IE—Indirect Expense, DE—Direct Expense, RP—Risk Provision, and ALL).

Field 410 allows a user to specify a starting procedure and its parameters (if any), and the Start button initiates execution of the starting procedure.

Stop button 412 and Clear button 414 are used to set and clear breaks in the execution of the SQL statements for the Profitability Calculations 200.

The bottom half 416 of the Window 400 provides a glimpse into the execution of the job as it is proceeding. Depending on the refresh rate selected at 418, the user can watch the job proceed in real time. All of the rows in the Calc_Engine_SQL table are presented in the bottom half 416 of the Window 400. The user can review status, elapsed times, etc.

The user can also review the run statistics in 420.

If the user sees anything that suggests the job should be stopped, the Window 400 provides the user with the opportunity to abort the job immediately (the Start button 410 turns to an Abort button while the job is running), or insert (or remove) breaks using 412 and 414 at any point in the execution processing using the Debug section.

Logic of the Preferred Embodiment

Figure 5:
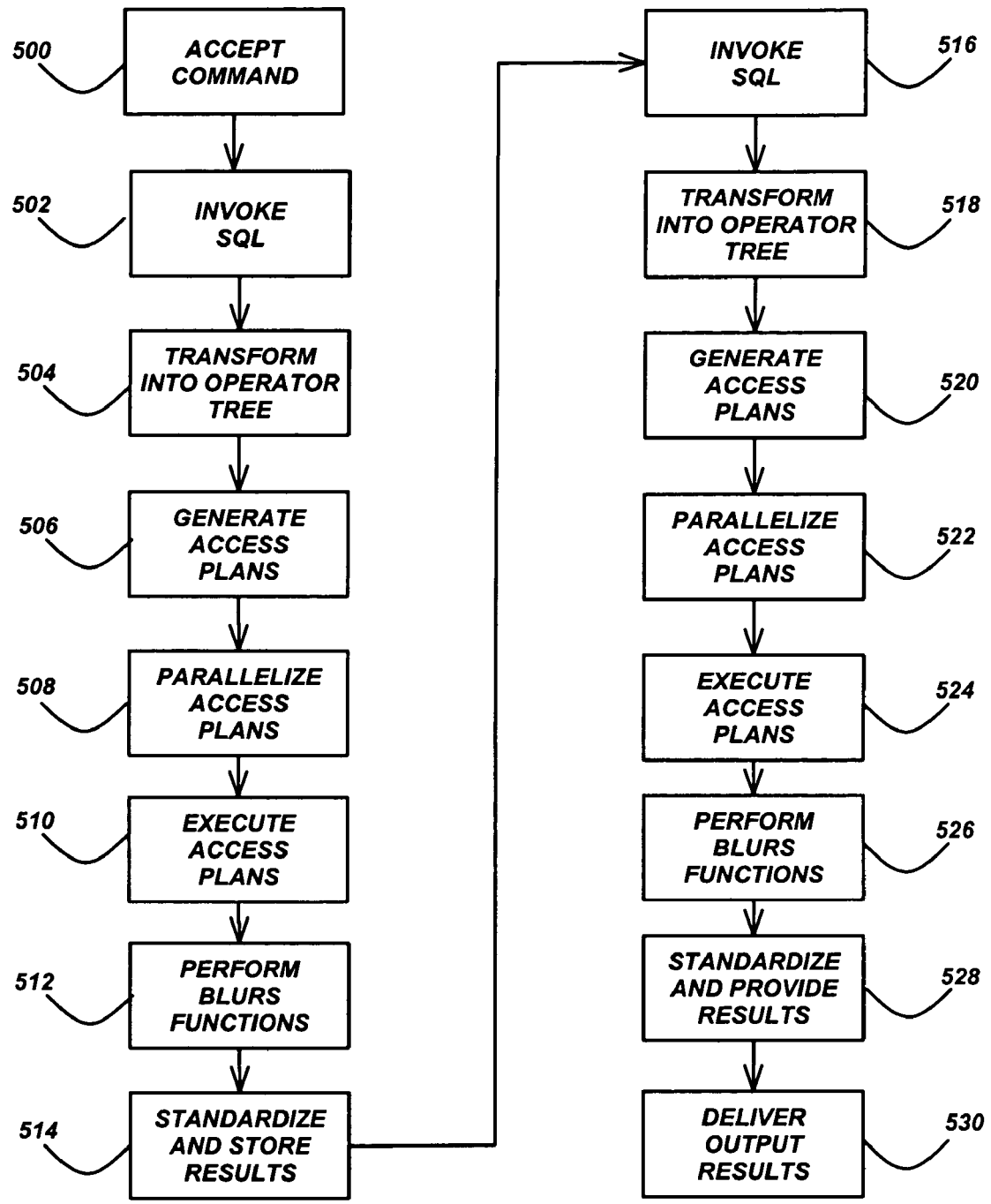
FIG. 5 is a flow chart illustrating the logic of the preferred embodiment of the present invention.

FIG. 5 is a flow chart illustrating the logic of the preferred embodiment of the present invention. Those skilled in the art will recognize that this logic is provided for illustrative purposes only and that different logic may be used to accomplish the same results.

Block 500 represents the Value Analyzer Client 102 accepting commands from a user to invoke or perform one or more Profitability Calculations 200.

Block 502 represents the Value Analyzer Calculation Engine 104 invoking one or more SQL macros in the RDBMS 106 to select accounts 202, events 204 and products 206 from the relational database based on the specified Profitability Calculations 200.

Block 504 represents the Parsing Engine 108 of the RDBMS 106 accessing the SQL macros and the SQL statements therein, and transforming the statements into an operator tree.

Block 506 represents the Parsing Engine 108 of the RDBMS 106 generating one or more access plans from the operator tree.

Block 508 represents the Parsing Engine 108 of the RDBMS 106 parallelizing the access plans, and then transmitting the access plans to their assigned Access Module Processors 110A-E of the RDBMS 106.

Block 510 represents the Access Module Processors 110A-E of the RDBMS 106 executing the access plans, and thereby performing the required data manipulation associated with the access plans received from the Parsing Engine 108, wherein the required data manipulation associated with the access plans are performed in parallel by the Access Module Processors 110A-E.

Block 512 represents the Value Analyzer system 100 performing the BLURS functions, which are described in more detail below.

Block 514 represents the Parsing Engine 108 of the RDBMS 106 standardizing the results received from the Access Module Processors 110A-E and storing the standardized results in the intermediate tables in the relational database.

Block 516 represents the Value Analyzer Calculation Engine 104 invoking one or more SQL macros in the RDBMS 106 to perform the calculation steps of the Profitability Calculations 200 by applying the Rules 210 to the results stored in the intermediate tables in the database.

Block 518 represents the Parsing Engine 108 of the RDBMS 106 accessing the SQL macros and the SQL statements therein, and transforming the statements into an operator tree.

Block 520 represents the Parsing Engine 108 of the RDBMS 106 generating one or more access plans from the operator tree.

Block 522 represents the Parsing Engine 108 of the RDBMS 106 parallelizing the access plans, and then transmitting the access plans to their assigned Access Module Processors 110A-E of the RDBMS 106.

Block 524 represents the Access Module Processors 110A-E of the RDBMS 106 executing the access plans, and thereby performing the required data manipulation associated with the access plans received from the Parsing Engine 108, wherein the required data manipulation associated with the access plans are performed in parallel by the Access Module Processors 110A-E.

Block 526 represents the Value Analyzer system 100 performing the BLURS functions, which are described in more detail below.

Block 528 represents the Parsing Engine 108 of the RDBMS 106 standardizing the results received from the Access Module Processors 110A-E and providing the standardized results to the Value Analyzer Calculation Engine 104.

Block 530 represents the Value Analyzer Calculation Engine 104 delivering the output or results from the Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Client 102, the Value Analyzer Calculation Engine 104, or other computer programs, as desired.

With regard to Blocks 512 and 526, although they are shown in a specific sequence, the BLURS functions may be performed before, during or after any of the other Blocks of the FIG. 5. Specifically, the Value Analyzer system 100 performs financial processing, which includes performing one or more Profitability Calculations 200 by applying one or more rules to account 202, product 206 and event 204 attributes accessed from the RDBMS 106. These Profitability Calculations 200 include the setup, generation and execution of SQL statements by the RDBMS 106. The Value Analyzer system 100, via Blocks 512 and 526, monitoring the Profitability Calculations 200 by monitoring the setup, generation and execution of the SQL statements by the RDBMS 106, in order to provide the BLURS functions for the Profitability Calculations 200. As noted earlier, the BLURS functions allow for n-level profitability calculations, execution management (bypass, user restartability), execution logging, and real-time status capabilities.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer system, which is a data-driven computer-facilitated financial model that provides accurate and consistent profitability calculations using account, product and event attributes stored in a relational database managed by a relational database management system (RDBMS). Profitability calculations are performed in the computer by applying one or more rules to the account, product and event attributes accessed from the database, wherein the profitability calculations include setup, generation and execution of structured query language (SQL) statements by the RDBMS. The present invention also monitors the profitability calculations by monitoring the setup, generation and execution of the SQL statements by the RDBMS, in order to provide bypass, logging, user restartability, or status (BLURS) functions for the profitability calculations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing data in one or more computers, comprising:
  (a) performing, in the one or more computers, a job comprised of one or more steps in a relational database management system (RDBMS), wherein the steps include setup, generation and execution of structured query language (SQL) statements by the RDBMS; and
  (b) monitoring, in the one or more computers, the steps by monitoring the setup, generation and execution of the SQL statements by the RDBMS, further comprising:
  (1) logging of information to the RDBMS, before and after each step of the job, concerning the setup, generation and execution of the SQL statements,
  (2) bypassing remaining steps of the job when an error occurs in the setup, generation and execution of the SQL statements, based on the logging of information to the RDBMS before and after each step of the job, resulting in the job being aborted,
  (3) providing user restartability of the aborted job from where the error occurred in the setup, generation and execution of the SQL statements, based on the logging of information to the RDBMS before and after each step of the job, by skipping previously successfully executed steps of the job and executing only the bypassed remaining steps of the aborted job, and
  (4) providing a status of the job, concerning the setup, generation and execution of the SQL statements, based on the logging of information to the RDBMS before and after each step of the job, thereby comprising Bypass, Logging, User Restartability and Status (BLURS) functions for the job, wherein the BLURS functions allow for execution management (bypass, user restartability), execution logging, and real-time status capabilities.

2. The method of claim 1, wherein the BLURS functions provide a Bypass functionality that recognizes when a fatal error has occurred, and aborts a job or bypasses remaining steps of the job.

3. The method of claim 1, wherein the BLURS functions provide a Logging functionality that captures information about a job, and archives the job when successful to an archive table in the RDBMS for future reference.

4. The method of claim 3, wherein the Logging functionality occurs before and after each statement is processed, and after restart and bypass checks.

5. The method of claim 1, wherein the BLURS functions provide a User Restartability functionality that automatically recognizes that a restart of a previously aborted job is in process and skips previously successful processing of the job, thereby picking up the job where the fatal error occurred.

6. The method of claim 5, wherein the User Restartability functionality uses Logging data to determine if a job is being newly run or restarted from an existing run.

7. The method of claim 1, wherein the BLURS functions provide a Status functionality that captures a current status of a job, allowing users to query a table in the RDBMS to obtain the current status of the job.

8. The method of claim 1, wherein the RDBMS stores a table used by the BLURS functionality to store generated SQL statements, current status of jobs, timings, activity counts or error codes for each SQL statement in real-time.

9. The method of claim 8, wherein the table is selected in order to view what SQL statement the RDBMS is currently processing, what SQL statements that have generated errors in the RDBMS, the current status of the job, the timings, the activity counts or the error codes for each SQL statement in real-time.

10. The method of claim 1, further comprising displaying an Engine Monitor Window on a computer that comprises a graphical user interface (GUI) for the BLURS functionality.

11. The method of claim 10, wherein the Engine Monitor Window provides a convenient way for the user to Start, Monitor, Break or Stop execution of a job.

12. An apparatus for processing data, comprising:
  one or more computers;
  logic, performed by the one or more computers, for
  (a) performing a job comprised of one or more steps in a relational database management system (RDBMS), wherein the steps include setup, generation and execution of structured query language (SQL) statements by the RDBMS; and
  (b) monitoring the steps by monitoring the setup, generation and execution of the SQL statements by the RDBMS, further comprising:
  (1) logging of information to the RDBMS, before and after each step of the job, concerning the setup, generation and execution of the SQL statements,
  (2) bypassing remaining steps of the job when an error occurs in the setup, generation and execution of the SQL statements, based on the logging of information to the RDBMS before and after each step of the job, resulting in the job being aborted, (3) providing user restartability of the aborted job from where the error occurred in the setup, generation and execution of the SQL statements, based on the logging of information to the RDBMS before and after each step of the job, by skipping previously successfully executed steps of the job and executing only the bypassed remaining steps of the aborted job, and (4) providing a status of the job, concerning the setup, generation and execution of the SQL statements, based on the logging of information to the RDBMS before and after each step of the job, thereby comprising Bypass, Logging, User Restartability and Status (BLURS) functions for the job, wherein the BLURS functions allow for execution management (bypass, user restartability), execution logging, and real-time status capabilities.

13. The apparatus of claim 12, wherein the BLURS functions provide a Bypass functionality that recognizes when a fatal error has occurred, and aborts a job or bypasses remaining steps of the job.

14. The apparatus of claim 12, wherein the BLURS functions provide a Logging functionality that captures information about a job, and archives the job when successful to an archive table in the RDBMS for future reference.

15. The apparatus of claim 14, wherein the Logging functionality occurs before and after each statement is processed, and after restart and bypass checks.

16. The apparatus of claim 12, wherein the BLURS functions provide a User Restartability functionality that automatically recognizes that a restart of a previously aborted job is in process and skips previously successful processing of the job, thereby picking up the job where the fatal error occurred.

17. The apparatus of claim 16, wherein the User Restartability functionality uses Logging data to determine if a job is being newly run or restarted from an existing run.

18. The apparatus of claim 12, wherein the BLURS functions provide a Status functionality that captures a current status of a job, allowing users to query a table in the RDBMS to obtain the current status of the job.

19. The apparatus of claim 12, wherein the RDBMS stores a table used by the BLURS functionality to store generated SQL statements, current status of jobs, timings, activity counts or error codes for each SQL statement in real-time.

20. The apparatus of claim 19, wherein the table is selected in order to view what SQL statement the RDBMS is currently processing, what SQL statements that have generated errors in the RDBMS, the current status of the job, the timings, the activity counts or the error codes for each SQL statement in real-time.

21. The apparatus of claim 12, further comprising logic for displaying an Engine Monitor Window on a computer that comprises a graphical user interface (GUI) for the BLURS functionality.

22. The apparatus of claim 21, wherein the Engine Monitor Window provides a convenient way for the user to Start, Monitor, Break or Stop execution of a job.

* * * * *

UNITED STATES PATENT AND TRADEMARK OFFICE
CERTIFICATE OF CORRECTION

PATENT NO. : 8,374,997 B2
APPLICATION NO. : 11/351827
DATED : February 12, 2013
INVENTOR(S) : Paul Phibbs et al.

It is certified that error appears in the above-identified patent and that said Letters Patent is hereby corrected as shown below:

Title Page, Item (73) Assignee "Teradota US, Inc."
should read -- Teradata US, Inc. --.

Signed and Sealed this
Nineteenth Day of March, 2013

Teresa Stanek Rea
*Acting Director of the United States Patent and Trademark Office*